US 7,912,934 B1

(12) United States Patent
Melton et al.

(10) Patent No.: US 7,912,934 B1
(45) Date of Patent: Mar. 22, 2011

(54) METHODS AND APPARATUS FOR SCHEDULING NETWORK PROBES

(75) Inventors: David Richard Melton, Harleston (GB); Thomas D. Nadeau, Hampton, NH (US); Sam K. Aldrin, Santa Clarita, CA (US)

(73) Assignee: Cisco Technology, Inc., San Jose, CA (US)

( * ) Notice: Subject to any disclaimer, the term of this patent is extended or adjusted under 35 U.S.C. 154(b) by 906 days.

(21) Appl. No.: 11/328,436

(22) Filed: Jan. 9, 2006

(51) Int. Cl.
*G06F 15/173* (2006.01)
*G06F 15/16* (2006.01)
*G06F 9/46* (2006.01)
*G06F 11/00* (2006.01)
*H04L 12/28* (2006.01)

(52) U.S. Cl. ........ 709/223; 709/224; 709/227; 370/252; 370/254; 718/100

(58) Field of Classification Search .................. 709/224, 709/223, 227; 370/395.5, 254, 252, 392, 370/410; 718/100
See application file for complete search history.

(56) References Cited

U.S. PATENT DOCUMENTS

| | | | |
|---|---|---|---|
| 6,205,488 B1 | 3/2001 | Casey et al. | 370/248 |
| 6,215,765 B1 | 4/2001 | McAllister et al. | 370/217 |
| 6,222,824 B1 | 4/2001 | Marin et al. | 370/230 |
| 6,337,861 B1 | 1/2002 | Rosen | 370/389 |
| 6,396,810 B1 | 5/2002 | Hebel | 370/229 |
| 6,459,682 B1 * | 10/2002 | Ellesson et al. | 370/235 |
| 6,477,522 B1 | 11/2002 | Young | 707/2 |
| 6,662,223 B1 | 12/2003 | Zhang et al. | 709/224 |
| 6,700,874 B1 | 3/2004 | Takihiro et al. | 370/248 |
| 6,807,515 B2 * | 10/2004 | Vogel et al. | 702/188 |
| 6,813,240 B1 | 11/2004 | Shah | 370/228 |
| 6,813,242 B1 | 11/2004 | Haskin et al. | 709/224 |
| 6,891,795 B1 | 5/2005 | Hamachi et al. | 370/227 |
| 6,963,927 B1 | 11/2005 | Lee et al. | 709/241 |
| 6,965,577 B1 | 11/2005 | Murphy | 370/255 |
| 7,076,559 B1 | 7/2006 | Ghanwani et al. | 709/230 |
| 7,080,141 B1 | 7/2006 | Baekelmans et al. | 370/389 |
| 7,120,118 B2 | 10/2006 | Rajagopal et al. | 370/237 |
| 7,139,278 B2 | 11/2006 | Gibson et al. | 370/401 |
| 7,154,858 B1 | 12/2006 | Zhang et al. | 370/252 |
| 7,280,486 B2 | 10/2007 | Suri | 370/248 |
| 7,382,738 B2 | 6/2008 | Ravindran et al. | 370/254 |
| 7,447,167 B2 | 11/2008 | Nadeau et al. | 370/250 |

(Continued)

FOREIGN PATENT DOCUMENTS

CN 1472924 A 2/2004

(Continued)

OTHER PUBLICATIONS

Chinese Office Action dated Aug. 1, 2008, for Application No. 200680010074.7, pp. 1-4.

(Continued)

*Primary Examiner* — Nathan Flynn
*Assistant Examiner* — Stephanie Chang
(74) *Attorney, Agent, or Firm* — Brinks Hofer Gilson & Lione

(57) ABSTRACT

A system identifies a plurality of probes used for verifying network operation, and classifies the plurality of probes into probe groups, according to at least one parameter associated with the network operation. The system schedules operation of the probe group in accordance with a classification associated with each probe group, and operates the probe group to verify network operation.

18 Claims, 7 Drawing Sheets

U.S. PATENT DOCUMENTS

| | | | |
|---|---|---|---|
| 7,463,591 B1 | 12/2008 | Kompella et al. | 370/248 |
| 7,466,655 B1 | 12/2008 | Zhao | 370/238 |
| 7,471,679 B2 | 12/2008 | Lee | 370/390 |
| 2001/0029543 A1 | 10/2001 | Iwata et al. | 709/233 |
| 2002/0093954 A1 | 7/2002 | Weil et al. | 370/389 |
| 2002/0118636 A1 | 8/2002 | Phelps et al. | 370/222 |
| 2002/0145981 A1 | 10/2002 | Klinker et al. | 370/244 |
| 2002/0165957 A1 | 11/2002 | Devoe et al. | 709/224 |
| 2003/0039212 A1 | 2/2003 | Lloyd et al. | 370/235 |
| 2003/0048754 A1 | 3/2003 | Bruckman | 370/252 |
| 2003/0048790 A1 | 3/2003 | McAllister et al. | 370/395.2 |
| 2003/0055925 A1* | 3/2003 | McAlinden | 709/221 |
| 2003/0058804 A1 | 3/2003 | Saleh et al. | 370/254 |
| 2003/0076825 A1 | 4/2003 | Guruprasad | 370/227 |
| 2003/0117962 A1 | 6/2003 | Mattson et al. | 370/389 |
| 2003/0118036 A1 | 6/2003 | Gibson et al. | 370/401 |
| 2003/0133443 A1 | 7/2003 | Klinker et al. | 370/353 |
| 2003/0147346 A1 | 8/2003 | Kanakubo | 370/254 |
| 2003/0156543 A1 | 8/2003 | Sahinoglu et al. | 370/238 |
| 2004/0081101 A1 | 4/2004 | Bennett | 370/252 |
| 2004/0179471 A1 | 9/2004 | Mekkittikul et al. | 370/218 |
| 2004/0190526 A1 | 9/2004 | Kumar et al. | 370/395.21 |
| 2004/0193709 A1 | 9/2004 | Selvaggi et al. | 709/224 |
| 2004/0199627 A1 | 10/2004 | Frietsch | 709/224 |
| 2004/0210892 A1 | 10/2004 | Sharma | 717/168 |
| 2004/0218542 A1 | 11/2004 | Lee | 370/248 |
| 2004/0218595 A1 | 11/2004 | Acharya et al. | 370/351 |
| 2004/0233859 A1 | 11/2004 | Martin | 370/254 |
| 2005/0013259 A1 | 1/2005 | Papoushado et al. | 370/217 |
| 2005/0018647 A1 | 1/2005 | Lebrun et al. | 370/254 |
| 2005/0022189 A1* | 1/2005 | Proulx et al. | 718/100 |
| 2005/0053005 A1 | 3/2005 | Cain et al. | 370/235 |
| 2005/0083835 A1 | 4/2005 | Prairie et al. | 370/224 |
| 2005/0207349 A1 | 9/2005 | Nagami et al. | 370/241 |
| 2005/0281192 A1 | 12/2005 | Nadeau et al. | 370/395.5 |
| 2006/0013142 A1 | 1/2006 | Hongal et al. | 370/248 |
| 2006/0126495 A1 | 6/2006 | Guichard et al. | 370/216 |
| 2006/0168208 A1 | 7/2006 | Nagami | 714/27 |
| 2006/0182034 A1 | 8/2006 | Klinker et al. | 370/238 |
| 2006/0182122 A1 | 8/2006 | Davie et al. | 370/392 |
| 2006/0198321 A1 | 9/2006 | Nadeau et al. | 370/254 |
| 2006/0215577 A1 | 9/2006 | Guichard et al. | 370/254 |
| 2006/0215579 A1 | 9/2006 | Nadeau et al. | 370/220 |
| 2006/0262772 A1 | 11/2006 | Guichard et al. | 370/351 |
| 2006/0268682 A1 | 11/2006 | Vasseur | 370/228 |
| 2007/0025241 A1 | 2/2007 | Nadeau et al. | 370/229 |
| 2007/0091897 A1 | 4/2007 | Lee et al. | 370/241.1 |
| 2007/0214388 A1 | 9/2007 | Auvenshine et al. | 370/400 |
| 2007/0280199 A1 | 12/2007 | Rong | 370/351 |
| 2008/0056142 A1 | 3/2008 | Arnold et al. | 370/248 |
| 2008/0080507 A1 | 4/2008 | Swallow et al. | 370/244 |
| 2008/0095045 A1 | 4/2008 | Owens et al. | 370/248 |
| 2008/0151746 A1 | 6/2008 | Vasseur et al. | 370/228 |
| 2008/0205284 A1 | 8/2008 | Azad | 370/241.1 |
| 2008/0304494 A1 | 12/2008 | Yokoyama | 370/400 |
| 2009/0003223 A1 | 1/2009 | McCallum et al. | 370/244 |
| 2009/0116396 A1 | 5/2009 | Regan et al. | 370/248 |

FOREIGN PATENT DOCUMENTS

| | | |
|---|---|---|
| JP | 2005-269460 | 9/2005 |
| WO | WO 03/049342 A2 | 6/2003 |
| WO | WO 2004/056047 A1 | 7/2004 |

OTHER PUBLICATIONS

Chinese Office Action dated Dec. 26, 2008, with English translation for Application No. 200680004006.X, pp. 1-15.

Chinese Office Action dated Mar. 20, 2009, for Application No. 200680010074.7, pp. 1-3.

Chinese Office Action dated Nov. 28, 2008, for Application No. 200680004044.5, pp. 1-10.

PCT International Search Report (PCT Articles 18 and Rules 43 and 44), pp. 1-3.

International Search Report, Aug. 7, 2007, pp. 1.

Kompella, Kireeti, Swallow, George, draft-ietf-mpls-lsp-ping-08.txt, ietf.org, dated Feb. 2005, pp. 1-43.

Stokes et al., Testing Hierarchical Virtual Private LAN Services, Jun. 2002, pp. 1-25.

Allan, D., Nadeau, T., RFC 4378—A Framework for Multi-Protocol Label Switching (MPLS) Operations and Management (OAM), dated Feb. 2006, pp. 1-11, IETF, www.ietf.org.

Cisco IP Solution Center MPLS VPN Management 4.2, dated 2006, pp. 1-6, Cisco Systems, Inc., San Jose, California.

Cisco Multiprotocol Label Switching Management Strategy, dated 2004, pp. 1-8, Cisco Systems, Inc., San Jose, California.

Lewis et al., Troubleshooting Virtual Private Networks, Chapter Title: Configuring MPLS VPNs, May 2004, pp. 1-17, Cisco Press, http://proquest.safaribooksonline.com.

Kompella, K., Pan, P., Sheth, N., Cooper, D., Swallow, G., Wadhwa, S., Bonica, R., Detecting MPLS Data Plane Failures—draft-ietf-mpls-lsp-ping-03.txt, dated Jun. 2003, pp. 1-23, IETF, www.ietf.org.

MPLS OAM Tools for Troubleshooting MPLS Networks, dated 2004, pp. 1-44, Cisco Systems, Inc., San Jose, California.

MPLS VPN—VRF Selection Based on Source IP Address, dated 2004, pp. 1-18, Cisco Systems, Inc., San Jose, California.

Rosen, E., Viswanathan, A., Callon, R., RFC 3031—Multiprotocol Label Switching Architecture, dated Jan. 2001, pp. 1-57, IETF, www.ietf.org.

Aissaoui, M., Bocci, M., Watkinson, D., Shah, H., Doolan, P., Busschbach, P., Delord, S., OAM Procedures for VPWS Interworking—draft-aissaoui-l2vpn-vpws-lw-oam-04.txt, dated Sep. 2005, pp. 1-23, IETF, www.ietf.org.

Nadeau, T., Morrow, M., Swallow, G., Allan, D., Matsushima, S., OAM Requirements for MPLS Networks—draft-ietf-mpls-oam-requirements-02.txt, dated Jun. 2003, pp. 1-13, IETF, www.ietf.org.

Bryant, S., Swallow, G., Martini, L., McPherson, D., RFC 4385—Pseudowire Emulation Edge-to-Edge (PWE3) Control Word for Use over an MPLS PSN, dated Feb. 2006, pp. 1-12, IETF, www.ietf.org.

Lewis et al., Troubleshooting Virtual Private Networks, Chapter Title: Troubleshooting MPLS VPNs, May 2004, pp. 1-59, Cisco Press, http://proquest.safaribooksonline.com.

Lewis et al., Troubleshooting Virtual Private Networks, Chapter Title: Troubleshooting Tools, May 2004, pp. 1-3, Cisco Press, http://proquest.safaribooksonline.com.

Martini, L., Rosen, E., El-Aawar, N., Smith, T., Heron, G., RFC 4447—Pseudowire Setup and Maintenance Using the Label Distribution Protocol (LDP), dated Apr. 2006, pp. 1-31, IETF, www.ietf.org.

Nadeau, T., Morrow, M., Busschbach, P., Aissaoui, M., Pseudo Wire (PW) OAM Message Mapping—draft-ietf-pwe3-oam-msg-map-03.txt, dated Sep. 2005, pp. 1-20, IETF, www.ietf.org.

Martini, L., Metz, C., Nadeau, T., Duckett, M., Balus, F., Segmented Pseudo Wire—draft-ietf-pwe3-segmented-pw-02.txt, dated Mar. 2006, pp. 1-30, IETF, www.ietf.org.

Nadeau, T., Aggarwal, R., Pseudo Wire Virtual Circuit Connectivity Verification (VCCV), dated Mar. 2004, pp. 1-14, IETF, www.ietf.org.

How to Troubleshoot the MPLS VPN, dated 2005, pp. 1-7, Cisco Systems, Inc., San Jose, California.

Awduche, D., Malcolm, J., Agogbua, J., O'Dell, M., McManus, J., RFC 2702—Requirements for Traffic Engineering Over MPLS, dated Sep. 1999, pp. 1-28, IETF, www.ietf.org.

Cisco MPLS Diagnostics Expert, dated 2005, pp. 1-11, White Paper, Cisco Systems, Inc., San Jose, California.

Welcher, P., BGP and MPLS-Based VPNs, dated Oct. 4, 2000, pp. 1-8, Chesapeake Netcraftsmen, www.netcraftsmen.net.

Brooks, A., Sacks, L., A Methodology for Monitoring LSP Availability in MPLS Networks, dated 2002, pp. 1-4, University College London, www.ee.ucl.ac.uk.

Rosen, E., Rekhter, Y., RFC 4364—BGP/MPLS IP Virtual Private Networks (VPNs), dated Feb. 2006, pp. 11-12, 16 and 24-26, The Internet Society, www.rfc-editor.org.

Kompella, K., Swallow, G., RFC 4379—Detecting Multi-Protocol Label Switched (MPLS) Data Plane Failures, dated Feb. 2006, pp. 1-47, IETF, www.ietf.org.

Office Action, dated May 25, 2010, pp. 1-8, U.S. Appl. No. 11/072,082, U.S. Patent and Trademark Office, Virginia.

Office Action, dated Mar. 5, 2010, pp. 1-28, U.S. Appl. No. 11/313,283, U.S. Patent and Trademark Office, Virginia.

European Search Report and Opinion, dated Nov. 27, 2009, pp. 1-7, European Patent Application No. 06739254.8-1249, European Patent Office, The Netherlands.

Notice of Abandonment, dated Jun. 16, 2010, pp. 1-2, U.S. Appl. No. 11/086,007, U.S. Patent and Trademark Office, Virginia.

Office Action, dated Aug. 5, 2010, pp. 1-2, U.S. Appl. No. 11/771,551, U.S. Patent and Trademark Office, Virginia.

Notice of Allowance, dated Oct. 6, 2010, pp. 1-14, U.S. Appl. No. 11/072,082, U.S. Patent and Trademark Office, Virginia.

Office Action, dated Jan. 5, 2011, pp. 1-14, U.S. Appl. No. 11/771,551, U.S. Patent and Trademark Office, Virginia.

* cited by examiner

208 CLASSIFY THE PLURALITY OF PROBES INTO PROBE GROUPS, ACCORDING TO AT LEAST ONE PARAMETER ASSOCIATED WITH THE NETWORK OPERATION

209 FOR EACH PROBE GROUP, IDENTIFYING A PROBE GROUP MAXIMUM TIME INDICATING A MAXIMUM TIME PERIOD DURING WHICH THE PROBE GROUP MUST SUCCESSFULLY IDENTIFY NETWORK OPERATION OF A DESTINATION NETWORK ADDRESS

210 CLASSIFY AT LEAST ONE OF THE PROBE GROUPS INTO PROBE SUB-GROUPS

211 IDENTIFY, FOR EACH PROBE SUB-GROUP, A PROBE SUB-GROUP MAXIMUM TIME INDICATING A MAXIMUM TIME PERIOD DURING WHICH THE PROBE SUB-GROUP MUST SUCCESSFULLY IDENTIFY NETWORK OPERATION OF A DESTINATION NETWORK ADDRESS, THE PROBE SUB-GROUP MAXIMUM TIME EQUAL TO OR LESS THAN THE PROBE GROUP MAXIMUM TIME

OR

212 IDENTIFY THE AT LEAST ONE PARAMETER AS A PROBE RATE INDICATING A RATE AT WHICH THE PROBE GROUPS ARE PROPAGATED

213 IDENTIFY A NORMAL RATE INDICATING A RATE AT WHICH THE PROBE GROUPS ARE PROPAGATED

214 IDENTIFY A FAILURE RATE, INDICATING A RATE AT WHICH THE PROBE GROUPS ARE PROPAGATED WHEN THE PROBE GROUPS FAIL TO SUCCESSFULLY REACH A DESTINATION NETWORK ADDRESS

*FIG. 3*

222 SCHEDULE OPERATION OF THE AT LEAST ONE PROBE GROUP IN ACCORDANCE WITH A CLASSIFICATION ASSOCIATED WITH EACH PROBE GROUP

223 OPTIMIZE A LOAD ON NETWORK OPERATION, THE OPTIMIZING A LOAD INCLUDING AT LEAST ONE OF:
I) IDENTIFYING A START TIME OF THE AT LEAST ONE PROBE GROUP
II) OVERLAPPING AN EXECUTION OF THE PROBE GROUPS TO MAXIMIZE RESOURCES WHILE REMAINING BELOW A PREDEFINED NETWORK OPERATION THRESHOLD
III) SCHEDULING THE PROBE GROUPS SUCH THAT THE PROBE GROUPS DO NOT EXCEED A PREDEFINED NETWORK OPERATION THRESHOLD
IV) SPECIFYING A NETWORK OPERATION PARAMETER AT WHICH THE PROBE GROUPS EXECUTE

224 PRIORITIZE THE AT LEAST ONE PROBE GROUP SUCH THAT THE START TIME OF THE AT LEAST ONE PROBE GROUP IS PRIOR TO A START TIME ASSOCIATED WITH ANY OTHER OF THE PROBE GROUPS

*FIG. 5*

225 OPERATE THE AT LEAST ONE PROBE GROUP TO VERIFY NETWORK OPERATION

226 COMPUTE A PROJECTED SYSTEM RESOURCE USAGE OF THE AT LEAST ONE PROBE GROUP

227 COMPUTE A PROJECTED SYSTEM RESOURCE USAGE FOR A NETWORK OPERATING AT A MAXIMUM CAPACITY FOR THE NETWORK

228 MONITOR A SYSTEM RESOURCE USAGE OF THE AT LEAST ONE PROBE GROUP

229 DERIVE A PERFORMANCE METRIC FROM THE SYSTEM RESOURCE USAGE AND THE PROJECTED SYSTEM RESOURCE USAGE FOR USE IN SCHEDULING THE AT LEAST ONE PROBE GROUP

FIG. 6

METHODS AND APPARATUS FOR SCHEDULING NETWORK PROBES

BACKGROUND

Conventional technologies for virtual networks, such as a virtual local area network (VLAN) operate by connecting devices (i.e., servers, workstations, etc) to create a network that is logically segmented on an organizational basis (i.e., project teams, geographical locations, college campuses, etc). Traffic traveling through a particular VLAN carries a unique virtual network identifier (such as a VLAN ID) as it traverses through the network. The VLAN ID allows VLAN switches and routers to selectively forward packets to ports with the same VLAN ID while disallowing traffic from one VLAN to be sent to devices on another VLAN.

The devices within a VLAN can be connected to the same VLAN, regardless of their physical connections to the network. A device within the VLAN can be physically moved without having to manually update the network address of that device. Reconfiguration of the network can be done through software rather than by physically unplugging and moving devices or wires.

Routers within the VLAN maintain Virtual Routing and Forwarding instances (VRFs). A VRF includes a network address routing table, a derived forwarding table, a set of interfaces that use the forwarding table, and a set of rules and routing protocols that determine what goes into the forwarding table.

Connectivity problems within a virtual network are detected by sending packets over the network, to probe and measure various performance metrics as well as to detect network faults. Conventional technologies schedule probes at set intervals to detect (and resolve) connectivity problems before a user encounters any connectivity problems, thus guaranteeing that any connectivity problems in the network are discovered within the set interval times in which the probes are scheduled.

SUMMARY

Conventional technologies for scheduling network probes suffer from a variety of deficiencies. In particular, conventional technologies for scheduling network probes are limited in that the probes are sent out serially in large batches, creating an uncontrollable traffic load on the network effectively reducing the bandwidth and other resources such as router CPU and memory, available to forward user data traffic. Responses from those probes return asynchronously, creating additional, and unpredictable traffic on the network. For example, a virtual private network (VPN) sends out one thousand probes, creating an additional load on the network. Those one thousand probes generate one thousand responses that arrive at varying rates, adding an additional load on the network. Other VPNs on the network are also sending out one thousand probes to test their respective VPNs. The resulting traffic on the network causes the network load to increase dramatically, and then decrease dramatically.

Embodiments disclosed herein significantly overcome such deficiencies and provide a system that includes a network scheduling process that schedules probes such that there is a relatively even load (of probe groups propagating) on the network, and instead of a surge of probe groups propagating, followed by a dearth of probe groups propagating along the network. The network scheduling process distributes the start time of probe groups, the spacing of probe groups, and the frequency of each set of probe groups to evenly spread the load on the network to effectively reduce the network load. The network scheduling process determines if new probes, or probe groups need to be added to (or deleted from) the existing probe groups. The number of new probes is determined, and the impact of those new probes on system resource usage metrics is determined. Using various system resource metrics, a start time is determined for each probe group. Factors including CPU, bandwidth, how many probes per second, how many probe responses per second, how many other probe groups are propagating, probe group rate, probe group priority, etc, can be factored into the scheduling of the probe groups. Probe group rates can include normal rates and probe group rates under fault conditions. The projected system resource usage is computed for both normal network scenarios and throttled network scenarios. The projected system resource usage is fed back into the network scheduling process. If the system resource usage metrics are not within the predetermined threshold, notification is sent. The network scheduling process triggers the probe groups at the determined start time, sending the probes out at the determined probe rate.

Embodiments disclosed herein provide a system that includes a network scheduling process that identifies a plurality of probes used for verifying network operation. The plurality of probes is classified into probe groups, according to at least one parameter associated with the network operation. The network scheduling process schedules operation of at least one probe group in accordance with a classification associated with each probe group, and operates the probe group to verify network operation.

During an example operation of one embodiment, suppose a device detects that a new probe group has been added to the bulk scheduling of probe groups. The network scheduling process determines the number of new probes being added to the new probe group and derives an impact of those new probes on the system resource usage metric. The network scheduling process derives a start time and a rate at which the new probe group will be transmitted. A 'normal' rate is determined as well as a 'throttled' rate for a scenario when the network operations are slowed down by increased network activity. Those metrics (i.e., the 'normal' rate and 'throttled' rate) are fed back into the network scheduling process to schedule the processing of the newly added probe group. If those derived metrics are not within a predefined threshold, an event is triggered. The triggering of an event can optionally result in a notification being emitted from the network scheduling process, to a remote management system.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a non-transitory computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a non-transitory computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when the network scheduling process classifies the plurality of probes into probe groups, and identifies parameters associated with each probe group, according to at least one parameter associated with the network operation, according to one embodiment disclosed herein.

FIG. 5 illustrates a flowchart of a procedure performed by the system of FIG. 1 when the network scheduling process schedules operation of the at least one probe group in accordance with a classification associated with each probe group, according to one embodiment disclosed herein.

FIG. 6 illustrates a flowchart of a procedure performed by the system of FIG. 1 when the network scheduling process operates the probe group to verify network operation, according to one embodiment disclosed herein.

DETAILED DESCRIPTION

Embodiments disclosed herein include a system that includes a network scheduling process that schedules probes such that there is a relatively even load (of probe groups propagating) on the network, instead of a surge of probe groups propagating, followed by a dearth of probe groups propagating along the network. The network scheduling process distributes the start time of probe groups, the spacing of probe groups, and the frequency of each set of probe groups to evenly spread the load on the network to effectively reduce the network load. The network scheduling process determines if new probes, or probe groups need to be added to (or deleted from) the existing probe groups. The number of new probes is determined, and the impact of those new probes on system resource usage metrics is determined. Using various system resource metrics, a start time is determined for each probe group: Factors including CPU, bandwidth, how many probes per second, how many probe responses per second, how many other probe groups are propagating, probe group rate, probe group priority, etc, can be factored into the scheduling of the probe groups. Probe group rates can include normal rates and probe group rates under fault conditions. The projected system resource usage is computed for both normal network scenarios and throttled network scenarios. The projected system resource usage is fed back into the network scheduling process. If the system resource usage metrics are not within the predetermined threshold, notification is sent. The network scheduling process triggers the probe groups at the determined start time, sending the probes out at the determined probe rate.

Figure 1:
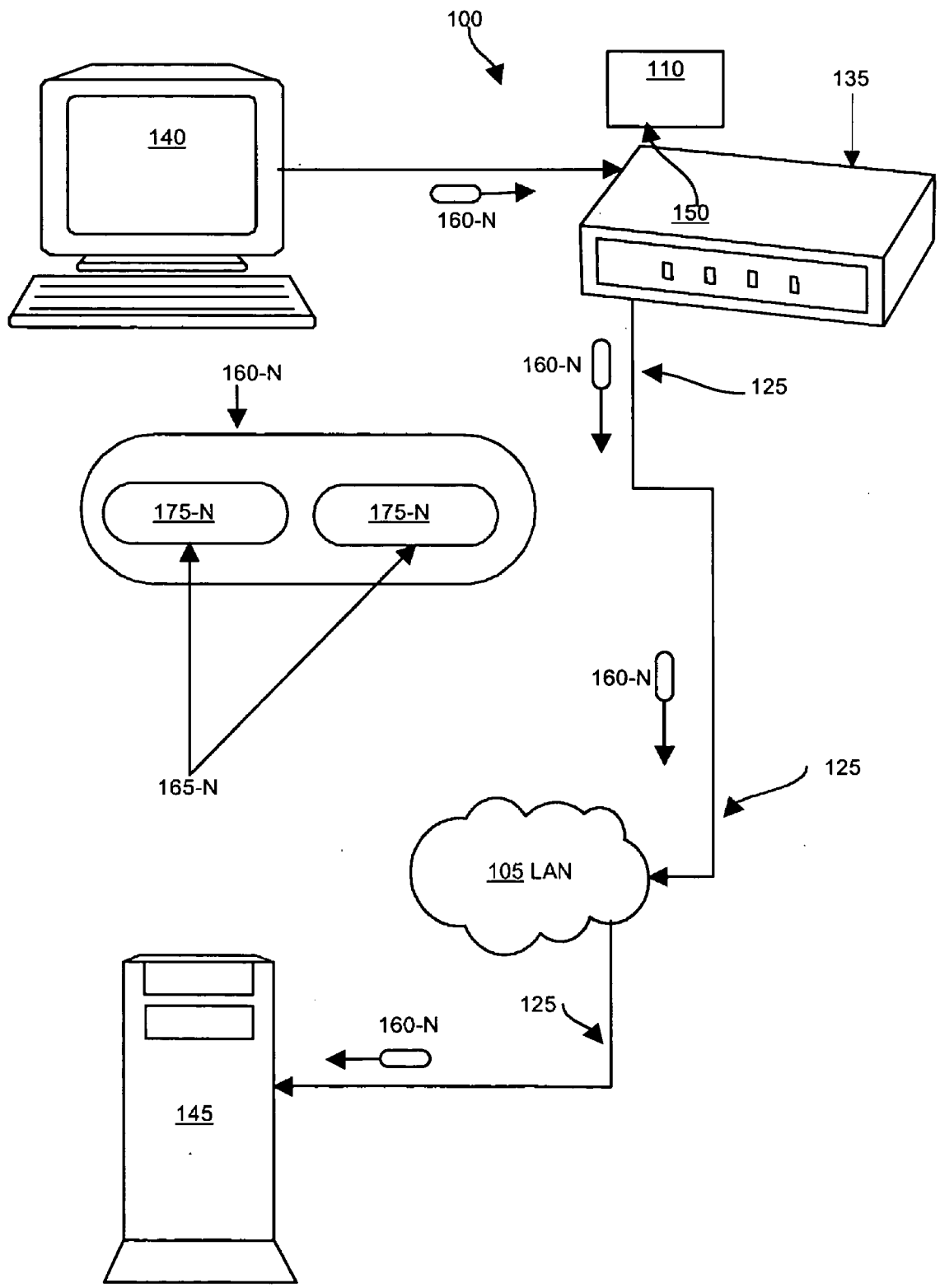
FIG. 1 shows a high level view of a network according to one embodiment disclosed herein.

FIG. 1 illustrates an example computer-networking environment 100 suitable for use in explaining example embodiments disclosed herein. The computer-networking environment 100 includes a router 135 containing a VRF 150 containing addressing information 110. The network scheduling process 140 identifies probe groups 160-N containing probe sub-groups 165-N. The probe sub-groups 165-N are comprised of a plurality of probes 175-N. The probe groups 160-N are transmitted via a virtual network 125 along a local area network (LAN) 105 towards a destination network address 145.

Further details of configurations explained herein will now be provided with respect to a flow chart of processing steps that show the high level operations disclosed herein.

Figure 2:
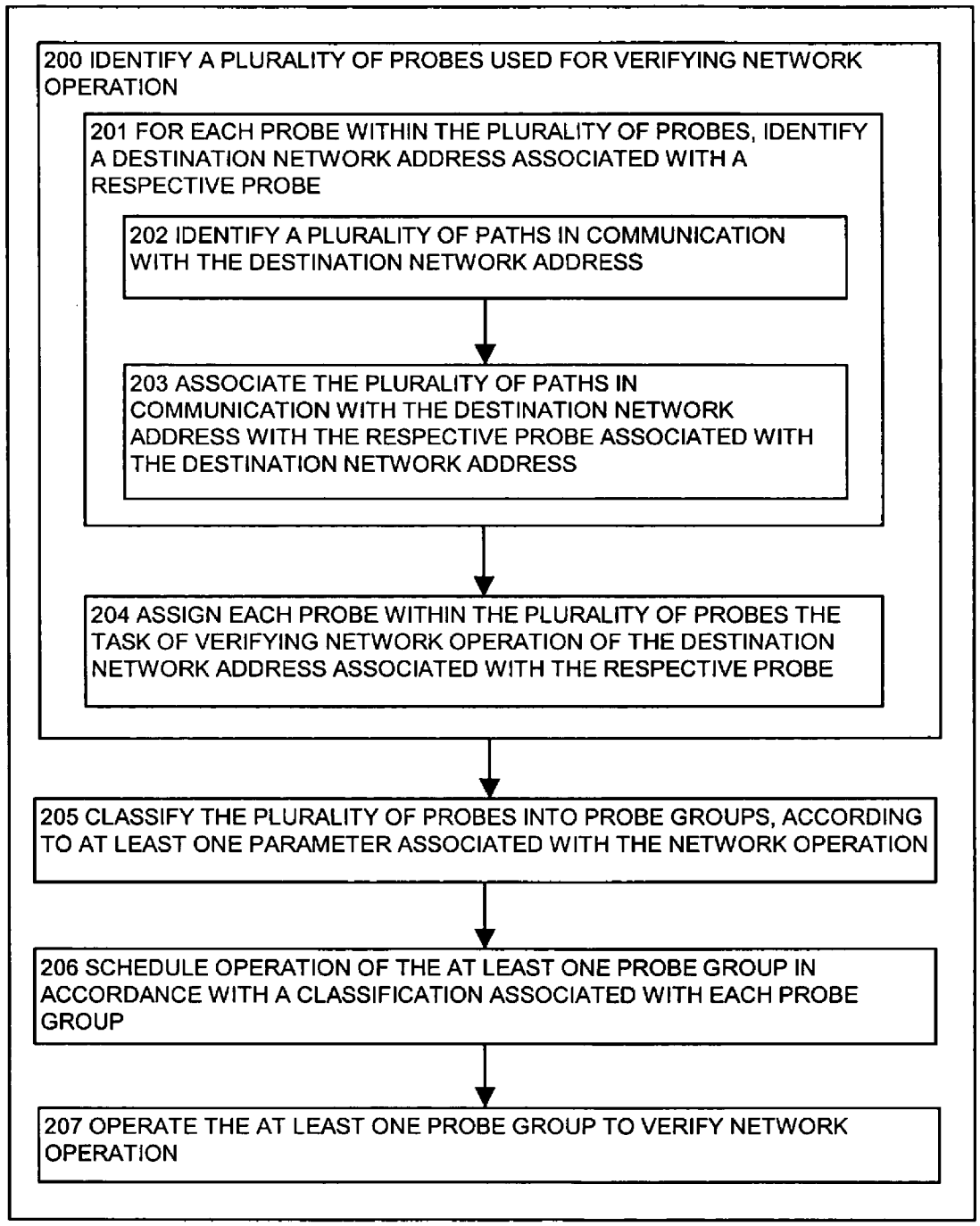
FIG. 2 illustrates a flowchart of a procedure performed by the system of FIG. 1 when the network scheduling process identifies a plurality of probes used for verifying network operation, according to one embodiment disclosed herein.

FIG. 2 is a flowchart of the steps performed by the network scheduling process 140 when it identifies a plurality of probes 175-N used for verifying network operation and schedules operation of those probes (i.e., the plurality of probes 175-N).

In step 200, the network scheduling process 140 identifies a plurality of probes 175-N used for verifying network operation. The probes are identified to monitor traffic on the computer-networking environment 100, to perform a connectivity check, and to detect problems such as jitter, delay, and loss. A probe 175-1 includes information of how to travel along the virtual network 125 to a destination network address 145, and receive a response from the destination network address 145, in return. A probe 175-1, essentially, is a task that is to be completed.

For each probe 175-1 within the plurality of probes 175-N, in step 201, the network scheduling process 140, identifies a destination network address 145 associated with a respective probe 175-1. In an example configuration, only one probe 175-1 is associated with a particular destination network address 145, regardless of how many virtual networks 125 identify that destination network address 145 as a point within those virtual networks 125. The probe 175-1 contains information pertaining to traveling to that destination network address 145 (i.e., such as which path to take to get to the destination network address 145, the starting time of the probe 175-1, the rate of the probe 175-1, etc), as well as what response to receive in return.

In step 202, the network scheduling process 140 identifies a plurality of paths in communication with the destination network address 145. In an example configuration, there are multiple paths that a probe 175-1 can take to get from a source network address to a destination network address 145.

In step 203, the network scheduling process 140 associates the plurality of paths in communication with the destination network address 145 with the respective probe 175-1 associated with the destination network address 145. In an example configuration, for each destination network address 145, the network scheduling process 140 identifies multiple paths from a source network address to the destination network address 145. Those multiple paths are associated with a probe 175-1.

In step 204, the network scheduling process 140 assigns each probe 175-1 within the plurality of probes 175-N the task of verifying network operation of the destination network address 145 associated with the respective probe 175-1. In an example configuration, each probe 175-1 is essentially a list of tasks related to verifying the connectivity of a destination network address 145. Each probe 175-1 contains information such as the destination network address 145, the multiple paths to the destination network address 145, the start time of the probe 175-1, the (traveling) rate of the probe 175-1, etc.

In step 205, the network scheduling process 140 classifies plurality of probes 175-N into probe groups 160-N, according to at least one parameter associated with the network operation. For example, a plurality of probes 175-N could be classified into a probe group 160-1 based on priority of the probes 175-N. In other words, the probes 175-N in the probe group 160-1 have a higher priority to propagate than other probes 175-M not in the probe group 160-1.

In step 206, the network scheduling process 140 schedules operation of the probe group 160-1 in accordance with a classification associated with each probe group 160-1. In an example configuration, the probe group 160-1 has a higher priority to propagate than other probe groups 160-N, and the network scheduling process 140 schedules operation of the probe group 160-1 prior to the other probe groups 160-N.

In step 207, the network scheduling process 140 operates the probe group 160-1 to verify network operation. The network scheduling process 140 propagates the probe group 160-1 to verify the connectivity of the destination network addresses 145 associated with each of the probes 175-N within the probe group 160-1.

FIG. 3 is a flowchart of the steps performed by the network scheduling process 140 when it classifies the plurality of probes 175-N into probe groups 160-N or identifies a probe rate, indicating a rate at which the probe groups 160-N are propagated, according to at least one parameter associated with the network operation.

In step 208, the network scheduling process 140 classifies the plurality of probes 175-N into probe groups 160-N, according to at least one parameter associated with the network operation. In an example configuration, the plurality of probes 175-N are classified into probe groups 160-N based on a parameter such as a priority of the plurality of probes 175-N, a start time associated with the plurality of probes 175-N, a rate of propagation associated with the plurality of probes 175-N, etc.

For each probe group 160-1, in step 209, the network scheduling process 140 identifies a probe group maximum time. The probe group maximum indicates a maximum time period during which the probe group 160-1 must successfully identify network operation of a destination network address 145. In other words, each probe group 160-1 has a maximum time in which to propagate along the virtual network 125 and verify connectivity of the destination network address 145.

In step 210, the network scheduling process 140 classifies at least one of the probe groups 160-N into probe sub-groups 165-N. The probe groups 160-N are comprised of a plurality of probes 175-N, but the plurality of probes 175-N can be further classified into probe sub-groups 165-N within the probe groups 160-N.

For each probe sub-group 165-1, in step 211, the network scheduling process 140 identifies, a probe sub-group maximum time. The probe sub-group maximum time indicates a maximum time period during which the probe sub-group must successfully identify network operation of a destination network address 145. The probe sub-group maximum time is equal to or less than the probe group maximum time. In other words, the probe group 160-1 has a maximum time in which the probe group 160-1 must complete the task of verifying network connectivity. The probe group 160-1 can be comprised of probe sub-groups 165-N that each have their own respective maximum time in which the respective probe sub-groups 165-N must complete the tasks of verifying network connectivity, and the probe sub-groups 165-N must complete their respective tasks before the probe group 160-1 is required to complete its (i.e., the probe group 160-1) task. In other words, the probe sub-group maximum time cannot exceed the probe group maximum time.

In step 212, the network scheduling process 140 identifies the at least one parameter as a probe rate indicating a rate at which the probe groups are propagated. In an example configuration, each probe group 160-1 has multiple parameters associated with the probe group 160-1, such as a priority associated with the probe group 160-1, a starting time of the probe group 160-1 (at which to begin propagating), a rate at which the probe group 160-1 will propagate along the virtual network 125, etc.

In step 213, the network scheduling process 140 identifies a normal rate indicating a rate at which the probe groups are propagated. In an example configuration, the normal rate is a rate at which the probe groups 160-N are propagated under normal conditions.

In step 214, the network scheduling process 140 identifies a failure rate, indicating a rate at which the probe groups 160-N are propagated when the probe groups 160-N fail to successfully reach a destination network address 145. In an example configuration, a user specifies a normal rate at which a probe group 160-1 is propagated along the virtual network 125, and a failure rate at which the probe group 160-1 is propagated if the probe group 160-1 fails to reach the destination network address 145.

Figure 4:
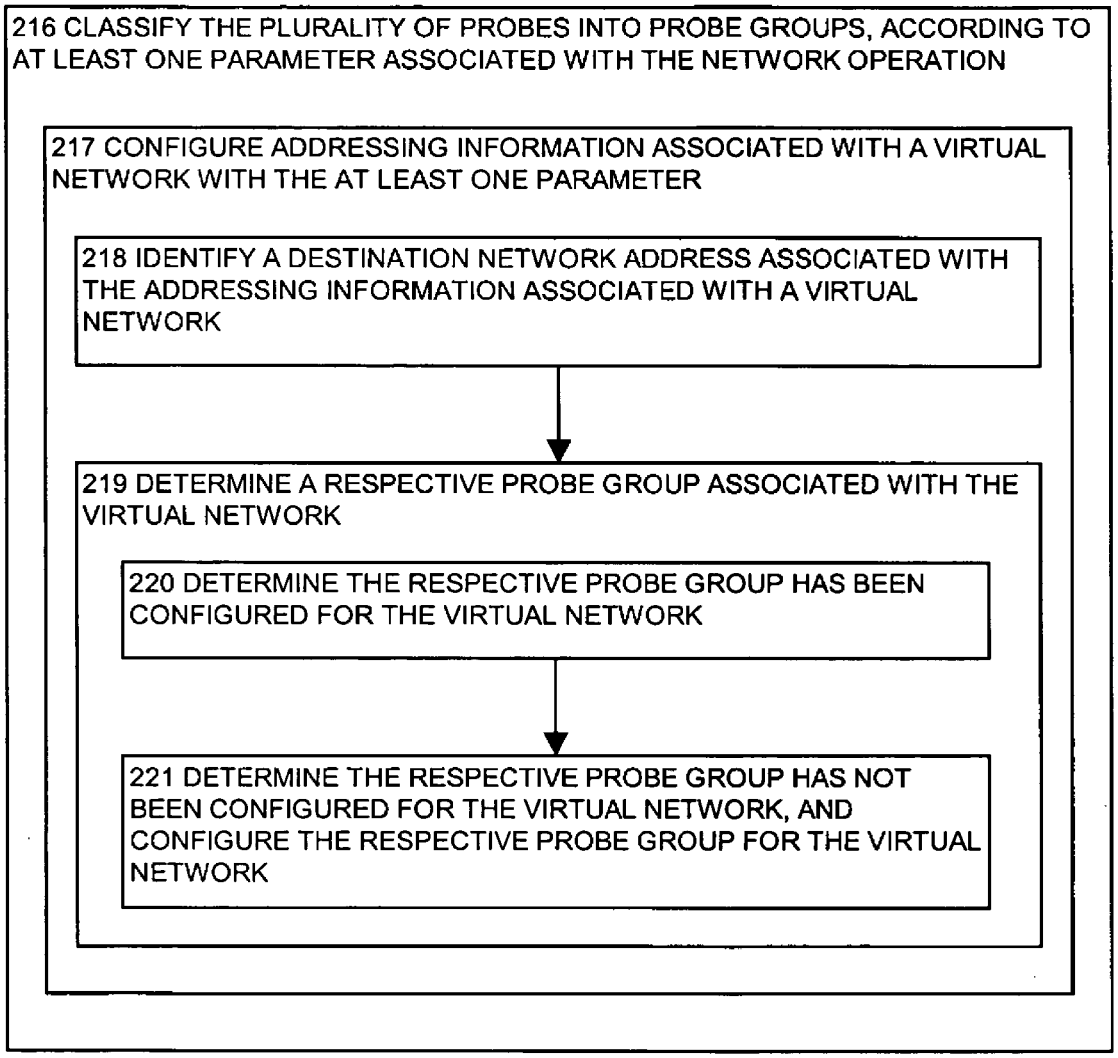
FIG. 4 illustrates a flowchart of a procedure performed by the system of FIG. 1 when the network scheduling process classifies the plurality of probes into probe groups, and configures addressing information associated with a virtual network based on parameters associated with each probe group, according to at least one parameter associated with the network operation, according to one embodiment disclosed herein.

FIG. 4 is a flowchart of the steps performed by the network scheduling process 140 when it classifies the plurality of probes 175-N into probe groups 160-N, and configures a VFR 150 with at least one parameter associated with a probe group 160-1.

In step 216, the network scheduling process 140 classifies the plurality of probes 175-N into probe groups 160-N, according to at least one parameter associated with the network operation. In an example configuration, the plurality of probes 175-N are classified into probe groups 160-N based on a parameter such as a priority of the plurality of probes 175-N, a start time associated with the plurality of probes 175-N, a rate of propagation associated with the plurality of probes 175-N, etc.

In step 217, the network scheduling process 140 configures addressing information 110 associated with a virtual network 125 with the parameter. In an example configuration, during the configuration of the VRF 150, a user, such as a network administrator, configures parameters (such as a number of probes per second, a maximum time in which the probe group 160-1 can propagate, etc) associated with a probe group 160-1.

In step 218, the network scheduling process 140 identifies a destination network address 145 associated with the addressing information 110 associated with a virtual network 125. In an example configuration, during configuration of a VRF 150 a user, such as a network administrator, identifies destination network addresses 145 associated with that particular VRF 150.

In step 219, the network scheduling process 140 determines a respective probe group 160-1 associated with the virtual network 125. In an example configuration, during configuration of the VRF 150, the respective probe group 160-1 associated with the respective destination network address 145 is identified as being associated with a particular VRF 150.

In step 220, the network scheduling process 140 determines the respective probe group 160-1 has been configured for the virtual network 125. In an example configuration, the probe group 160-1 is linked to the VRF 150 via the destination network address 145 (associated with both the VRF 150 and the probe group 160-1), and the network scheduling process 140 determines the probe group 160-1 has been configured for the virtual network 125. The network scheduling process 140 may need to adjust the probe group schedule based on the information that this probe group 160-1 has already been created. In an example configuration, a user, such as a network administrator, configures the parameters of the probe group 160-1 during the configuration of the VRF 150.

In step 221, the network scheduling process 140 determines the respective probe group 160-1 has not been configured for the virtual network 125, and configures the respective probe group 160-1 for the virtual network 125. In an example configuration, the probe group 160-1 has been linked to the VRF 150 via the destination network address 145 (associated with both the VRF 150 and the probe group 160-1). The network scheduling process 140 determines the probe group 160-1 has not been configured for the virtual network 125, and configures the probe group 160-1 accordingly. In other words, if the probe group 160-1 does not exist, the probe group 160-1 must be created.

FIG. 5 is a flowchart of the steps performed by the network scheduling process 140 when it schedules operation of the probe group 160-1 in accordance with a classification associated with each probe group 160-1, and optimizes the load on network operation.

In step 222, the network scheduling process 140 schedules operation of the probe group 160-1 in accordance with a classification associated with each probe group 160-1. For example, if the probe group 160-1 has a probe group start time earlier than any other probe group 160-N, then the network scheduling process 140 schedules operation of the probe group 160-1 prior to any of the other probe groups 160-N.

In step 223, the network scheduling process 140 optimizes a load on network operation. In an example configuration, the optimization includes identifying a start time of the probe group 160-1. The network scheduling process 140 schedules the probe groups 160-N according to their respective start times. In another example configuration, the network scheduling process 140 overlaps a propagation of the probe groups 160-N to maximize resources while remaining below a predefined network operation threshold. In other words, if propagating probe group 160-1 does not maximize network resources, the network scheduling process 140 may also begin to propagate probe groups 160-2 and 160-3 (during the propagation of probe group 160-1) as long as the propagation of probe groups 160-1, 160-2 and 160-3 does not exceed a predefined threshold for utilizing network resources. In yet another example configuration, the network scheduling process 140 schedules the probe groups 160-N such that the probe groups 160-N do not exceed a predefined network operation threshold. The network scheduling process schedules the probe groups 160-N such that each probe 175-1 completes its task (of verifying network connectivity) during the time period specified for that probe 175-1. The network scheduling process also schedules the probe groups 160-N such that there is an even load (of probe groups 160-N propagating) along the virtual network 125, and not a surge of probe groups 160-N propagating, followed by a dearth of probe groups 160-N propagating. In yet another example configuration, the network scheduling process 140 specifies a network operation parameter at which the probe groups 160-N execute (i.e., propagate). For example, the operation parameter could be a start time of the probe groups 160-N, a propagation rate of the probe groups 160-N during normal operation, a propagation rate of the probe groups 160-N during a probe group 160-1 failure, a priority assigned to a probe group 160-1 (i.e., a probe group 160-1 can be assigned a higher priority than other probe groups 160-N, etc), the CPU capacity of the device on which the network scheduling process is operating, the current bandwidth of the traffic on the device, how many responses are returning from the propagating probe groups 160-N, etc.

In step 224, the network scheduling process 140 prioritizes at least one probe group 160-1 such that the start time of the at least one probe group 160-1 is prior to a start time associated with any other of the probe groups 160-N.

FIG. 6 is a flowchart of the steps performed by the network scheduling process 140 when it operates at least one probe group 160-1 to verify network operation, and monitors the effect of the propagation of the probe group 160-1 on the system resource usage of the network.

In step 225, the network scheduling process 140 operates the probe group 160-1 to verify network operation. The network scheduling process 140 propagates the probe group 160-1 to verify the connectivity of the destination network addresses 145 associated with each of the probes 175-N within the probe group 160-1.

In step 226, the network scheduling process 140 computes a projected system resource usage of the probe group 160-1. The network scheduling process 140 computes the effect propagating the probe group 160-1 will have on system resource usage prior to actually propagating the probe group 160-1.

In step 227, the network scheduling process 140 computes a projected system resource usage for a network operating at a maximum capacity for the network. The network scheduling process 140 computes the effect propagating the probe group 160-1 will have on system resource usage (for a network operating at a maximum capacity) prior to actually propagating the probe group 160-1.

In step 228, the network scheduling process 140 monitors a system resource usage of at least one probe group 160-1. In an example configuration, as the network scheduling process 140 propagates the probe groups 160-N, the network scheduling process 140 monitors the impact each probe group 160-1 has on the system resource usage of the virtual network 125.

In step 229, the network scheduling process 140 derives a performance metric from the system resource usage, and the projected system resource usage for use in scheduling at least one probe group 160-1. In an example configuration, the network scheduling process 140-1, when computing the scheduling of each probe group 160-1, factors into the scheduling, both the (actual) system resource usage and the projected system resource usage. In other words, during propagating of the probe group 160-1, the network scheduling process can monitor the system resource usage of the probe group 160-1, predict what the system resource usage of the probe group 160-1 will be under different network conditions, and adjust the scheduling of the probe group 160-1 accordingly.

Figure 7:
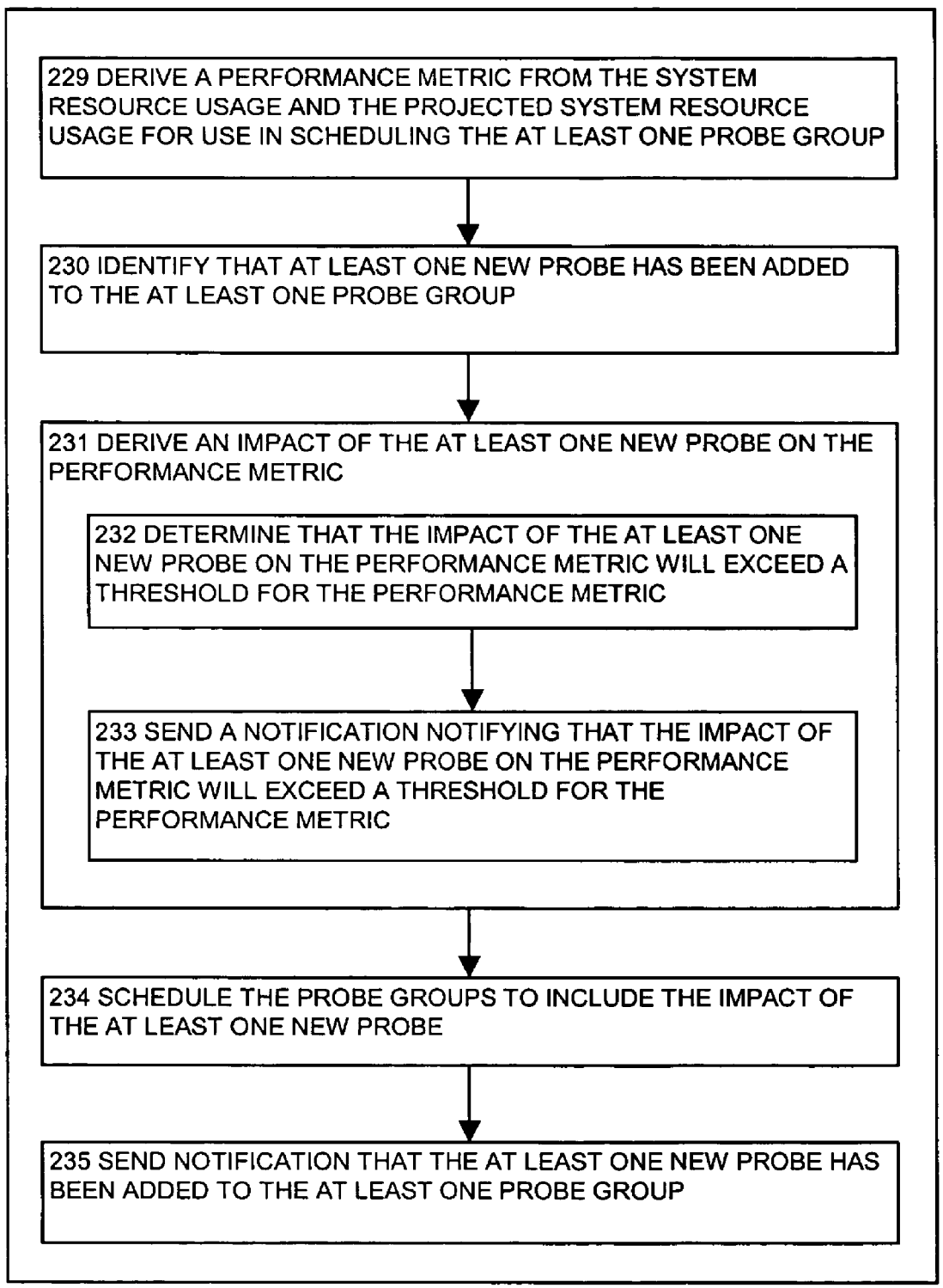
FIG. 7 illustrates a flowchart of a procedure performed by the system of FIG. 1 when the network scheduling process derives a performance metric from the system resource usage and the projected system resource usage for use in scheduling the at least one probe group, according to one embodiment disclosed herein.

FIG. 7 is a flowchart of the steps performed by the network scheduling process 140 when it identifies a new probe 175-1 has been added to a probe group 160-1, and derives both a performance metric from the system resource usage, and the projected system resource usage for use in scheduling the probe group 160-1 (with the newly added probe 175-1).

In step 230, the network scheduling process 140 identifies that at least one new probe 175-1 has been added to the at least one probe group 160-1. In an example configuration, probe groups 160-N can have probes 175-N added to, or deleted from the probe groups 160-N.

In step 231, the network scheduling process 140 derives an impact of at least one new probe 175-1 on the performance metric. In an example configuration, the network scheduling process 140 re-computes the impact the probe group 160-1 will have on system resource usage, when a new probe 175-1, or a plurality of probes 175-N have been added to the probe group 160-1.

In step 232, the network scheduling process 140 determines that the impact of the new probe 175-1 on the performance metric will exceed a threshold for the performance metric. In an example configuration, there exist pre-defined network usage thresholds that the network scheduling process 140 takes into account when computing the scheduling of probe groups 160-N. In an example configuration, the network scheduling process 140 determines that a probe group 160-1, with a newly added probe 175-1, will exceed a pre-defined network usage threshold, due to the addition of the probe 175-1 to the probe group 160-1.

In step 233, the network scheduling process 140 sends a notification notifying that the impact of the at least one new probe 175-1 on the performance metric will exceed a threshold for the performance metric. In an example configuration, the network scheduling process 140 determines that a probe group 160-1, with a newly added probe 175-1, will exceed a pre-defined network usage threshold, due to the addition of the probe 175-1 to the probe group 160-1, and sends a notification to that effect.

In step 234, the network scheduling process 140 schedules the probe groups to include the impact of the at least one new probe 175-1. In an example configuration, the network scheduling process 140 determines that a probe group 160-1, with a newly added probe 175-1, will exceed a pre-defined network usage threshold. The network scheduling process 140 re-schedules the probe group 160-1 such that propagation of the probe group 160-1 will not exceed a pre-defined network usage threshold. For example, probe group 160-1 may have been propagated with probe groups 160-2 and 160-3. By removing probe group 160-1 from this plurality of probe groups (i.e., probe groups 160-2 and 160-3) and propagating probe group 160-1 after probe groups 160-2 and 160-3 have completed propagation, the system resource usage impact of probe group 160-1 will not exceed the pre-defined network usage threshold.

In step 235, the network scheduling process 140 sends notification that the new probe 175-1 has been added to the probe group 160-1. In an example configuration, the network scheduling process 140 adds a new probe 175-1 to the probe group 160-1, determines the impact of that newly added probe 175-1 on the probe group 160-1 and schedules the probe group 160-1 accordingly (i.e., with the newly added probe 175-1).

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of scheduling network processing, the method comprising:
   identifying a plurality of probes, each respective one of the probes assigned to a network operation to verify connectivity in at least one virtual network, each one of the probes including a destination network address and a probe rate, the probe rate being indicative of a rate at which the respective one of the probes is propagated;
   classifying, with a processor, the probes into a plurality of probe groups based on at least one parameter of the probes to verify connectivity in the at least one virtual network, the probes in each respective one of the probe groups sharing a respective common classification based on the at least one parameter of the probes, the at least one parameter of the probes including the probe rate;
   optimizing, with the processor, network load resulting from the probes by scheduling, with the processor, operation of each respective one of the probe groups in accordance with the respective common classification, wherein scheduling the operation of each respective one of the probe groups comprises determining start times of the probe groups and probe group rates of the probe groups, the start times being distributed over time; and
   operating the probe groups as scheduled to verify connectivity in the at least one virtual network.

2. The method of claim 1 further comprising:
   identifying a plurality of paths in communication with the destination network address; and
   associating the plurality of paths with the respective probe associated with the destination network address.

3. The method of claim 1 wherein classifying the probes into probe groups comprises:
   for each probe group, determining a probe group maximum time indicative of a maximum time period during which the probe group must successfully complete the network operation.

4. The method of claim 3 wherein determining a probe group maximum time comprises:
   classifying at least one of the probe groups into probe sub-groups; and
   determining, for each probe sub-group, a probe sub-group maximum time indicative of a maximum time period during which the probe sub-group must successfully complete the network operation, the probe sub-group maximum time equal to or less than the probe group maximum time.

5. The method of claim 1 wherein determining the probe group rates of the probe groups comprises:
   identifying a normal rate indicative of a rate at which the probe groups are propagated; and
   identifying a failure rate indicative of a rate at which the probe groups are propagated when the probe groups fail to successfully reach a destination network address.

6. The method of claim 1 wherein classifying the probes into probe groups comprises:
configuring addressing information associated with a virtual network with the at least one parameter.

7. The method of claim 6 wherein configuring addressing information associated with a virtual network with the at least one parameter comprises:
identifying the destination network address associated with the addressing information; and
determining a respective probe group associated with the virtual network.

8. The method of claim 7 wherein determining a respective probe group associated with the virtual network comprises, in response to determining the respective group has not been configured for the virtual network, configuring the respective probe group for the virtual network.

9. The method of claim 1 wherein operating the probe groups as scheduled to verify connectivity in the at least one virtual network comprises:
computing a projected system resource usage to result from operation of at least one probe group, the at least one probe group included in the probe groups;
monitoring a system resource usage resulting from operation of the at least one probe group; and
deriving a performance metric from the system resource usage and the projected system resource usage for use in scheduling the at least one probe group.

10. The method of claim 9 comprising:
determining that at least one new probe has been added to the at least one probe group;
deriving an impact of the at least one new probe on the performance metric;
scheduling the probe groups further based on the impact of the at least one new probe; and
sending notification that the at least one new probe has been added to the at least one probe group.

11. The method of claim 10 wherein deriving the impact of the at least one new probe on the performance metric comprises:
determining that the impact of the at least one new probe on the performance metric will exceed a threshold for the performance metric; and
sending a notification notifying that the impact of the at least one new probe on the performance metric will exceed a threshold for the performance metric.

12. The method of claim 9 wherein computing the projected system resource usage of the at least one probe group comprises:
computing a projected system resource usage for a network operating at a maximum capacity for the network.

13. A computerized device comprising:
a memory;
a processor;
a communications interface;
an interconnection mechanism coupling the memory, the processor and the communications interface;
wherein the memory is encoded with a network processing scheduling application that, when executed with the processor, schedules network processing on the computerized device by performing the operations of:
identifying a plurality of probes, each respective one of the probes assigned to a network operation to verify connectivity in the at least one virtual network, each one of the probes including a destination network address and a probe rate, the probe rate being indicative of a rate at which the respective one of the probes is propagated;
classifying the probes into a plurality of probe groups according to at least one parameter of the probes, wherein classifying the probes into the probe groups results in the probes in each respective one of the probe groups sharing a respective common classification based on the at least one parameter of the probes, the at least one parameter of the probes including a priority;
optimizing network load resulting from the probes by scheduling operation of each respective one of the probe groups in accordance with the respective common classification, wherein scheduling the operation of each respective one of the probe groups comprises determining start times of the probe groups and probe group rates of the probe groups, the start times being distributed over time; and
operating the probe groups as scheduled to verify connectivity in the at least one virtual network.

14. The computerized device of claim 13 wherein when the computerized device performs the operation of operating the probe groups as scheduled, the computerized device further performs the operations of:
computing a projected system resource usage of at least one probe group, the at least one probe group included in the probe groups;
monitoring a system resource usage of the at least one probe group; and
deriving a performance metric from the system resource usage and the projected system resource usage for use in scheduling the at least one probe group.

15. The computerized device of claim 14 wherein the computerized device further performs the operations of:
identifying that at least one new probe has been added to the at least one probe group;
deriving an impact of the at least one new probe on the performance metric;
scheduling the probe groups also based on the impact of the at least one new probe; and
sending notification that the at least one new probe has been added to the at least one probe group.

16. A non-transitory computer readable storage medium encoded with computer programming logic that when executed with a processor in a computerized device produces a network processing scheduling process that schedules network processing by causing the computerized device to perform the operations of:
identifying a plurality of probes, each respective one of the probes assigned to verify connectivity in the at least one virtual network, each one of the probes including a destination network address and a probe rate, the probe rate indicating a rate at which the respective one of the probes is transmitted;
classifying the probes into a plurality of probe groups according to at least one parameter of the probes, wherein classifying the probes into the probe groups results in the probes classified in each respective one of the probe groups sharing a respective common classification;
optimizing network load resulting from the probes by scheduling operation of the each respective one of the probe groups based on the respective common classification, wherein scheduling the operation of each respective one of the probe groups comprises determining start times of the probe groups and probe group rates of the probe groups, the start times being distributed over time; and
operating the probe groups as scheduled to verify connectivity in the at least one virtual network.

17. The computerized device of claim 13 wherein when the computerized device performs the operation of scheduling the operation of the probe groups, the computerized device further schedules overlapping operation of the probe groups to maximize network resources while also limiting network load that results from operation of the probe groups as scheduled to remain below a predefined network operation threshold.

18. The computerized device of claim 13 wherein when the computerized device performs the operation of optimizing the network load resulting from the probes, the computerized device further performs the operations of:

scheduling a respective start time of each respective one of the probe groups to limit utilization of network resources caused by propagation of the probe groups to within a predefined network operation threshold; and dynamically readjusting the predefined network operation threshold.

\* \* \* \* \*